Patented Oct. 12, 1926.

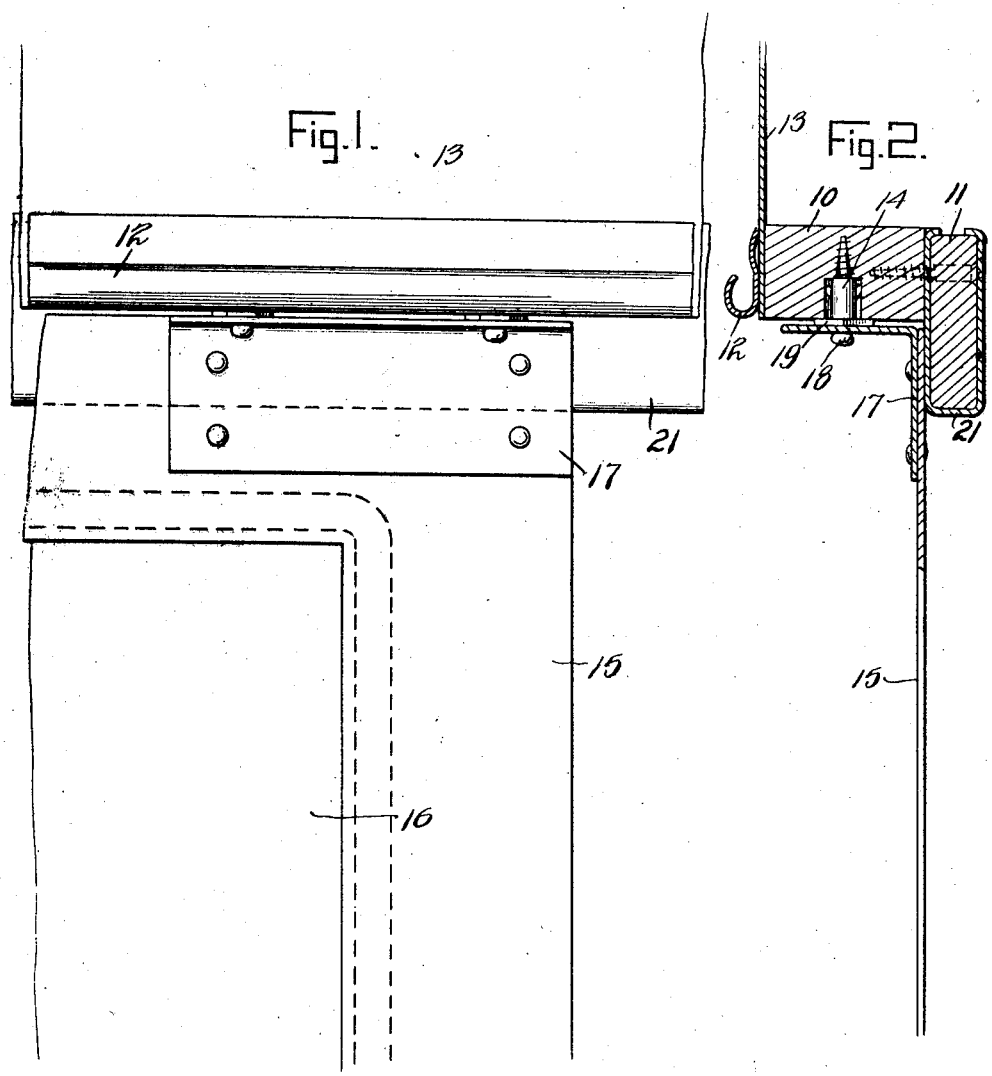

1,603,010

UNITED STATES PATENT OFFICE.

MATTHEW R. HULL, OF CONNERSVILLE, INDIANA, ASSIGNOR TO REX MANUFACTURING COMPANY, OF CONNERSVILLE, INDIANA, A CORPORATION OF INDIANA.

CURTAIN ATTACHMENT FOR AUTOMOBILE TOPS.

Application filed March 29, 1924. Serial No. 702,960.

My said invention relates to a summer curtain for vehicles said curtain being so formed as to be quickly detachable and being intended for use in connection with demountable tops of automobiles. It is an object of the invention to provide means for attachment of a curtain of this character which shall not interfere with the placing of rigid windows forming a part of the demountable winter top.

A further object of the invention is to provide attaching means on the curtain which shall be rigid and permanent and which shall form a reinforcement for the curtain adjacent to the corner of the same.

Referring to the accompanying drawings, which are made a part hereof, and on which similar reference characters indicate similar parts:

Figure 1 is a side elevation taken from the outside of the machine; and

Figure 2 a vertical section thereof.

In the drawings reference character 10 indicates one of the side rails forming a part of the window frame surrounding a window of an automobile body said frame also including reinforcing rails 11 against which the window sash rests and having a trip molding 12 above the window. In some cases the parts 10 and 11 will be formed from a single piece of material but in the present instance the part 10 is a side rail independent of the reenforcing rail 11 more particularly described and claimed in my copending application No. 702,959 of even date herewith.

A portion of the facing or top covering material is indicated at 13.

The reinforcing rail is preferably covered with sheet steel 21 though this may be dispensed with if desired.

A socket 14 of any convenient form and size is located in a recess formed in the side rail 10. The curtain 15 of any conventional material usually flexible has a side opening 16 closed by flexible transparent material such as celluloid. The frame of the curtain, according to my invention, has a bracket 17 secured thereto at each corner and these brackets carry fasteners 18 of any conventional or preferred type adapted to cooperate with the sockets 14. The fasteners are so located on the reenforcement that the latter presses the curtain firmly against a surface behind the curtain. Above the bracket is a flange 19 of the fastener.

From the foregoing it will be evident that when the curtain is removed and rolled up the reenforcement 17, the fastener 18 and its flange 19 go with the curtain while the socket 14 stays in place. The socket, however, is flush with the surface of the side rail and therefore does not interfere at all with the positioning of a rigid window for winter use when such change becomes desirable, the rear surface of the window sash abutting against the front face of the rails 11 and the peripheral faces approaching more or less closely to the inner surfaces of rails 10.

It will be obvious to those skilled in the art that changes may be made in my device without departing from the spirit of the invention and therefore I do not limit myself to the precise construction shown in the drawings and described in the specification but only as indicated in the appended claims.

Having thus fully described my said invention what I claim is:

In a demountable vehicle top, a window frame having rear and peripheral supporting surfaces, sockets flush with the peripheral supporting surfaces, a summer curtain having fasteners adapted to coact with said sockets and reenforcing means secured to the curtain at the corners to which said fasteners are fixed the fasteners being so located relatively to the reinforcing means as to cause the latter to press the curtain against said rear supporting surface, substantially as set forth.

In witness whereof, I have hereunto set my hand and seal at Connersville, Indiana, this 25th day of March, A. D. nineteen hundred and twenty-four.

MATTHEW R. HULL. [L. S.]